United States Patent [19]

Takamatsu

[11] 4,331,375
[45] May 25, 1982

[54] ELECTRICAL CONTACT ASSEMBLY

[75] Inventor: Seietsu Takamatsu, Hamura, Japan

[73] Assignee: Tokyo Shibaura Denki Kabushiki Kaisha, Kawasaki, Japan

[21] Appl. No.: 96,410

[22] Filed: Nov. 21, 1979

[30] Foreign Application Priority Data

Nov. 28, 1978 [JP] Japan ............................ 53-146066
May 28, 1979 [JP] Japan ............................ 54-70587[U]

[51] Int. Cl.³ .............................................. H01R 4/48
[52] U.S. Cl. ............................ 339/210 R; 339/256 R; 339/258 R
[58] Field of Search ........... 339/252 F, 256 R, 256 C, 339/256 SP, 258 R, 258 F, 258 S, 259 R, 259 F, 191 R, 191 A, 192 R, 206 R, 206 P, 207, 208, 209-210

[56] References Cited

U.S. PATENT DOCUMENTS

| | | | |
|---|---|---|---|
| 2,064,037 | 12/1936 | Sandin | 339/259 F |
| 2,162,453 | 6/1939 | Field | 339/207 R |
| 2,881,407 | 4/1959 | Winter | 339/191 R |
| 3,086,191 | 4/1963 | Olashaw | 339/196 |
| 3,168,683 | 2/1965 | Brokaw | 317/119 |
| 3,516,045 | 6/1970 | Gaines et al. | 339/207 R |
| 3,649,953 | 3/1972 | Hoffman | 339/258 R |
| 3,869,192 | 3/1975 | Maier et al. | 339/258 R |
| 4,026,622 | 5/1977 | Siciliano | 339/258 R |

Primary Examiner—John McQuade
Attorney, Agent, or Firm—Stevens, Davis, Miller & Mosher

[57] ABSTRACT

An electrical contact assembly used for a circuit breaker comprises a pair of relatively movable U-shaped contact and bar conductor, and a holder provided with a recess for receiving the U-shaped contact. The U-shaped contact has contacting portions formed by slightly bending both sides thereof inwardly to form a narrow opening for clamping the bar conductor. The electrical contact assembly further comprises conductive members which are disposed on both sides of the U-shaped contact and electrically connected thereto, so that currents passing through the conductive members symmetrically flow in a direction opposite to a flow direction of currents passing through the both sides of the U-shaped contact when the U-shaped contact and the bar conductor are engaged.

5 Claims, 19 Drawing Figures

ELECTRICAL CONTACT ASSEMBLY

BACKGROUND OF THE INVENTION

This invention relates to an electrical contact assembly used for a circuit breaker of a control center.

In a known control center including circuit breakers, control units constructed by control means, such as a circuit breaker and an electromagnetic contactor, are accommodated in multistage in a frame board of the control center so that the control units can be drawn out therefrom. In the circuit breaker, a movable contact is arranged to contact with or separate from a stationary contact disposed at the rear portion of the frame board in accordance with the movement of the control unit in a direction to draw out the movable contact from the frame board.

The circuit breaker unit includes interrupting units located on a power source side at which a bus bar and a control unit are interconnected and on a load side connected to an external cable of the control unit.

FIG. 1 is a general perspective view showing a control unit located on the load side, in which reference numeral 3 designates a control unit including a distribution circuit breaker 1 and an electromagnetic contactor 2, and bar conductors 5 are used as a movable contact unit 4a on the movable side. FIG. 2 shows a frame board 6 for accommodating the control units 3 in multistage and a plurality of compartments for accommodating control units are formed by inserting plates 7 into the frame board 6 at different levels. On the side of each compartment 8 is attached a stationay contact unit 4b which is connected to or separated from the movable contact unit 4a shown in FIG. 1.

FIGS. 3a and 3b show a general structure of a stationary main circuit breaker unit, in which U-shaped contacts 11 of the stationary contact unit 4b are provided to contact with or separate from the bar conductors 5 on the movable side 4a. Each of the U-shaped contacts 11 is prepared by forming a plate conductor into a U-shape having contacting portions 11a which are formed by slightly bending the sides thereof inwardly to form a narrow opening for clamping the movable contact therebetween. Although the bar conductor 5 is caused to engage and clamped by the contacting portions 11a, the U-shaped contact 11 can be made of a resilient electrically conductive material or the bar conductor may be sandwiched by using another suitable resilient members, not shown. The U-shaped contacts 11 are supported by a holder 12 provided with recesses 13 for receiving the contacts 11.

FIG. 4 shows a cross-sectional view taken along the line IV—IV in FIG. 3b, in which the bottom of the U-shaped contact 11 is connected to one end of a connecting conductor 14 and to the other end thereof is secured a screw 15 which connects the conductor 14 to an external cable, not shown.

When the control unit 3 is inserted into the compartment 8, the bar conductor 5 is also inserted between the narrowed contacting portions 11a of the U-shaped contact. In this inserted condition, current flows through the contacts and if a large current accidentally flows in such a case as short circuit, a large electromagnetic repulsive force is generated in proportions to the current flown, thereby widely separating the opening between the contacting portions 11a thus generating electric arc which damages the U-shaped contact 11. Therefore, in order to avoid such separation phenomenon or damage described above, it is desired to preliminarily impart contact force to the contacting portions 11a to overcome the repulsive force generated at a time when large current flows. However, in a case where a U-shaped contact with relatively large contact force is used, a large operating power is required to insert the control unit 3 into and draw out it from the frame board 6. In addition, since the connecting conductor 14 is sometimes bent by strong vibration of the cable caused by the electromagnetic force due to short circuit current, it is necessary to detachably connect the conductor 14.

FIG. 5 shows another example of a prior art circuit breaker unit on the movable side, in which a U-shaped contact 32 is arranged to contact with a stationary bar conductor 31, for example, a bus bar. In this example, the U-shaped contact 32 is formed by using two resilient conductors and the opening thereof is narrowed so as to form contacting portions 32a between which the bar conductor 31 is to be inserted and clamped.

The U-shaped contacts 32 are supported by a holder 33 covered by a cover 34 and provided with recesses 35 for receiving the U-shaped contacts 32. A projection 36 is formed in the recess 35 for guiding the contact 32. FIG. 6 shows a cross-sectional view taken along the line VI—VI in FIG. 5, in which the U-shaped contact 32 is connected to an electric cable 41 by, for example, welding. When the movable contact unit is moved to engage the U-shaped contact 32 with the bar conductor 31, the projection 36 serves to guide the contact 32 so as to cause the center line thereof to coincide with that of the bar conductor 31, and the U-shaped contact 32 is separated from the bar conductor 31 by moving the contact unit leftwardly in FIG. 6.

With the example shown in FIGS. 5 and 6, the same adverse result as described with reference to the former example shown in FIGS. 1 through 4 is caused when a large current accidentally flows. In addition, regarding the latter example, it is difficult to sufficiently utilize the space in the control unit for the reason that the cable 41 connected to the contact 32 has a vertical portion 40 as shown in FIG. 6 and another member cannot be disposed thereon.

SUMMARY OF THE INVENTION

Accordingly, an object of this invention is to provide an improved electrical contact assembly capable of reducing an electromagnetic repulsive force so as to always maintain an ideal contact condition even when a large current flows.

Another object of this invention is to provide an electrical contact assembly comprising a compact contact unit which can be easily operated.

According to this invention, there is provided an electrical contact assembly used for a circuit breaker of the type comprising a pair of relatively movable U-shaped contact and bar conductor to be connected to the U-shaped contact, and a holder provided with a recess for receiving the U-shaped contact, end portions near the opening of the U-shaped contact being narrowed to form contacting portions between which the bar conductor to be clamped when they are engaged, and the electrical contact assembly is characterized by comprising conductive members disposed on both sides of the U-shaped contact and electrically connected thereto so that when the U-shaped contact and the bar conductor are engaged, currents passing through the conductive members symmetrically flow in a direction opposite to a flow direction of currents passing through the both sides of the U-shaped contact.

DESCRIPTION OF THE PREFERRED EMBODIMENTS

Figure 1:
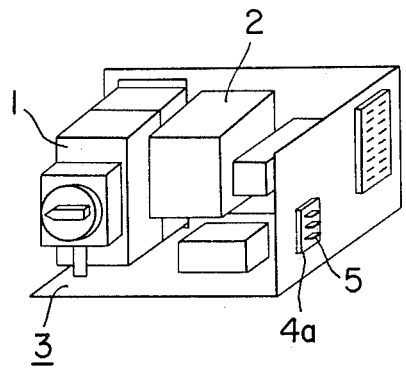
FIG. 1 shows a perspective view of a prior art control unit including an electrical contact assembly on the stationary side.
Figure 2:
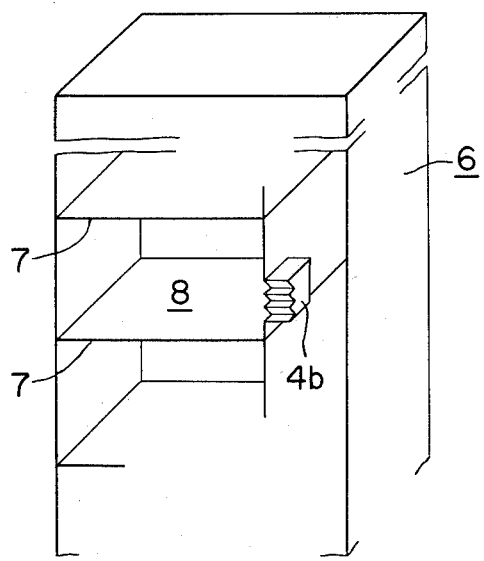
FIG. 2 is a perspective view showing a frame board to accommodate the control unit of FIG. 1.
Figure 3A:
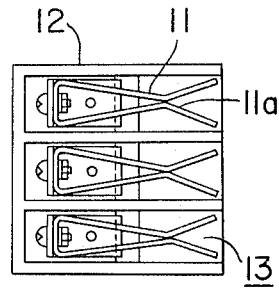
FIGS. 3a and 3b are plan and side views respectively of the prior art contact assembly.
Figure 3B:
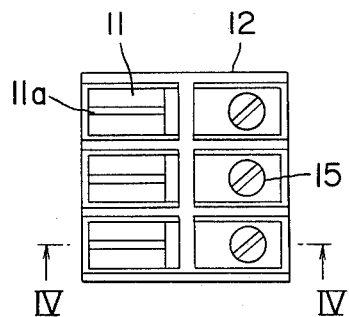
Figure 4:
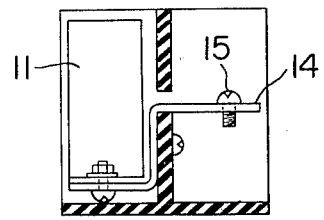
FIG. 4 is a cross-sectional view taken along the line IV—IV in FIG. 3b
Figure 5:
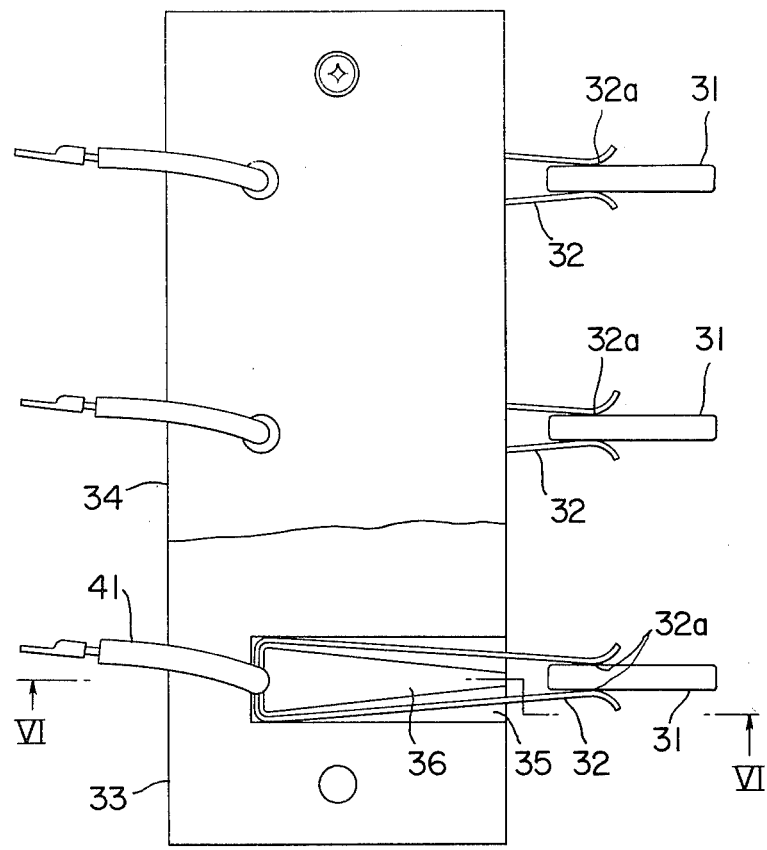
FIG. 5 is a side view, partially broken away, of a prior art electrical contact assembly on the stationary side.
Figure 6:
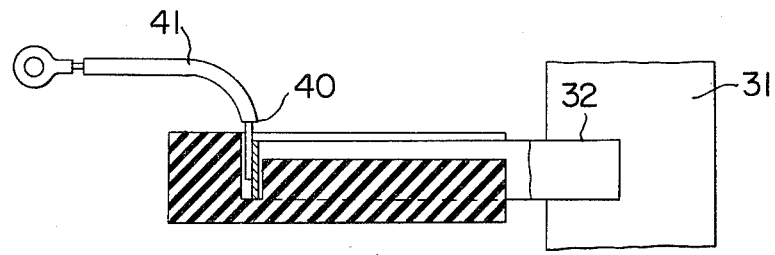
FIG. 6 is a cross-sectional view taken along the line VI—VI shown in FIG. 5.
Figure 7:
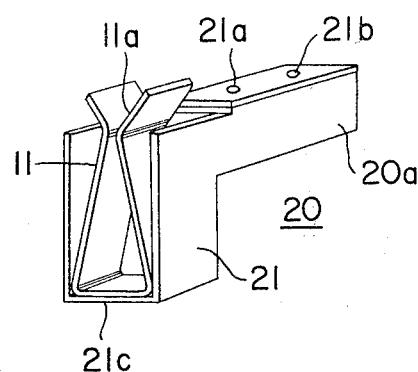
FIG. 7 is a perspective view of a contact unit on the stationary side embodying this invention.

As shown in FIG. 7, according to this invention a U-shaped contact 11 made of a bar of resilient conductive material is provided with contacting portions 11a formed by slightly deforming the bar inwardly to form a narrow opening therebetween and the contact 11 is received in a U-shaped conductive member 21. The U-shaped member 21 is provided with an extension 20a having an overlapped upper portion which is provided with a hole 21a for securing the U-shaped member 21 to a holder described hereinafter and a hole 21b for connecting a cable, not shown. The bottom flat portion of the U-shaped contact 11 received in the U-shaped member 21 is secured to the bottom 21c thereof by means of welding or bolts, thus completing the stationary contact unit 20.

Figure 8:
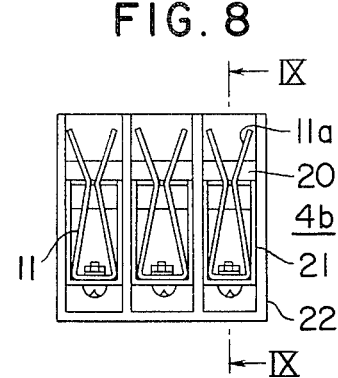
FIG. 8 is a plan view showing an electrical contact assembly including the contact unit shown in FIG. 7.
Figure 9:
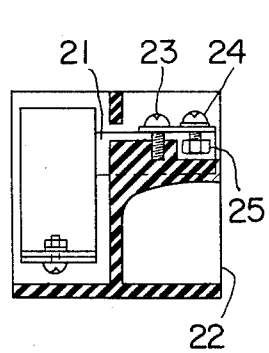
FIG. 9 is a cross-sectional view taken along the line IX—IX shown in FIG. 8.

FIGS. 8 and 9 show a condition in which a plurality of stationary contact units 20 are accommodated in a holder 22. In FIGS. 8 and 9, the contact units 20 are secured to the holder 22 by screws 23, and one end of the external cable, not shown, is clamped by a bolt 24 and a nut 25 which is embedded in the holder 22.

Figure 10:
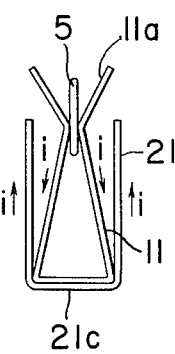
FIG. 10 is an end view of the contact unit shown in FIG. 7 for explaining current flow directions.

The operation of the contact unit 20 according to this invention is described hereunder in conjunction with FIG. 10.

When the bar conductor 5, acting as a movable contact, is inserted into the narrowed contacting portions 11a of the U-shaped contact 11, current i flows to the external cable through the contacting portions 11a, connected bottom 21c, and both sides of the U-shaped member 21 in directions shown by arrows in FIG. 10. At this moment, although repulsive force is generated so as to separate the contacting portions 11a, since the currents i having the same intensity flow through both sides of the U-shaped contact 11 in the same direction as shown in FIG. 10, electromagnetic attractive force is generated to prevent the separation of the U-shaped contact 11 due to Fleming's rule. In addition, the currents flowing through the both sides of the U-shaped contact 11 flow through the both sides of the U-shaped member 21 in a direction opposite to that in the both sides of the U-shaped contact 11, respectively, and at this time, the repulsive force is generated at both sides between the conductive member 21 and the contact 11. However, all repulsive force therebetween acts on the U-shaped contact 11 so as to attract the contacting portions 11a with each other for the reason that the outer surfaces of the both sides of the U-shaped member 21 are closely supported by side or partition walls of the holder 22. Therefore, even if a large current flows, the strong repulsive force between the contacting portions 11a is substantially overcome by the electromagnetic attractive force generated therebetween, thereby preventing the contacting portions 11a from separating. Additionally, since the nut 25 is embedded in the holder 22, the vibration caused by the electromagnetic attractive or repulsive force acting on the external cable can be absorbed by the holder 22, thereby preventing the U-shaped conductive member 21 from bending. The bolt 24 is attached to a portion facing to the front surface of the frame board 6, so that the external cable can easily be connected thereto.

Figure 11:
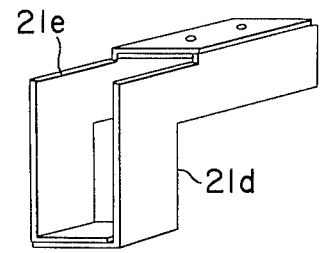
FIG. 11 is a perspective view showing one example of a contact unit according to this invention.

FIG. 11 shows another example of the U-shaped conductive member 21 fabricated by two parts 21d and 21e, in which the bottom of the U-shaped member 21 is formed by overlapping the bottom parts 21d and 21e so as to increase the mechanical strength of the bottom of the U-shaped member.

In the foregoing embodiment, a stationary contact unit engages a movable bar conductor, but in a modification shown in FIGS. 12 through 15, a movable contact unit engages a stationary bar conductor.

Figure 12A:
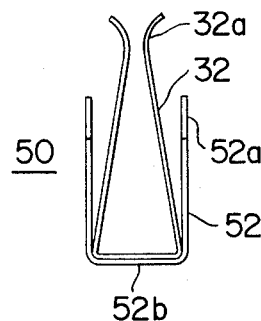
FIGS. 12a and 12b are plan and side views showing a contact unit on the movable side according to this invention.
Figure 13A:
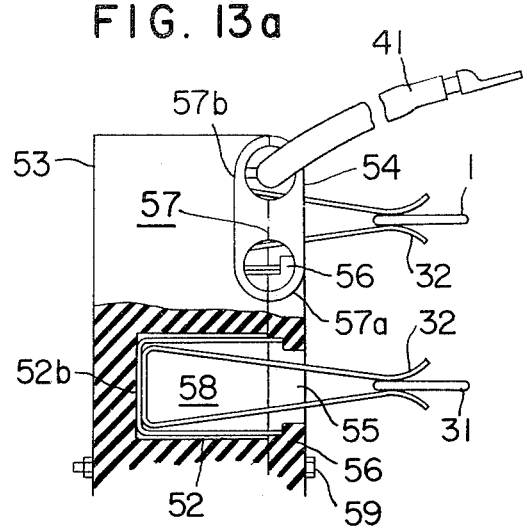
FIGS. 13a and 13b are plan and side views showing a part of an electrical contact assembly including the contact unit shown in FIGS. 12a and 12b.
Figure 13B:
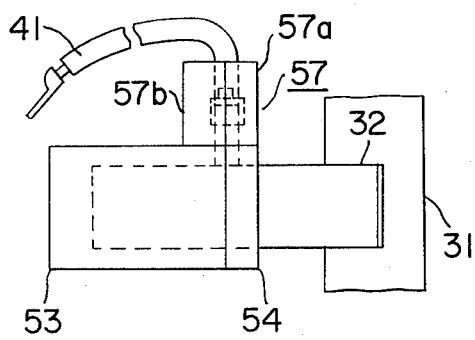

FIG. 12a shows a contact unit 50 in which a U-shaped contact 32 is received in a U-shaped conductive member 52 provided with projections 52a. The bottom portions of the U-shaped contact 32 and U-shaped member 52 are integrally secured together by means of welding or bolts. An electric cable leading to external distribution circuit is connected to the projection 52a by means of welding or the like as shown in FIGS. 13a and 13b. FIG. 13a shows a condition in which the contact units 50 are housed in a holder 53 and covered by a cover 54 which is provided with openings 55 through which U-shaped contacts 32 project outwardly and with shoulders 56 adapted to engage the free ends of the U-shaped members 52 when the cover 54 is applied. A semi-cylindrical member 57a, provided with semi-circular recesses, is mounted on the cover 54. The holder 53 is provided with a similar semi-cylindrical member 57b, provided with semi-circular recesses, which is fitted to the member 57a to form a cylindrical member 57, thus providing through holes for receiving the projections 52a and cable 41.

When the movable contact unit 50 is connected to the bar conductor 31, the contact unit 50 is first inserted into the recess 58 of the holder 53 and the cover 54 is then applied to the holder 53 so that the free ends of the projections 52a of the U-shaped member 52 will contact to the shoulder 56 of the cover 54 and the connecting portions 32a of the U-shaped contact 32 will project through the opening 55 of the cover 54. The holder 53 is then pushed rightwardly so as to clamp the bar conductor 31 between the narrowed contacting portions 32a of the U-shaped contact 32 as shown in FIG. 13a. This connection can be exactly performed for the reason that the U-shaped member is firmly held by the walls of the recess 58 and the top ends of the projections 52 are supported by the shoulders 56 thereby guiding the connecting portions 32a without being irregularly moved.

The contact unit 50 is separated from the bar conductor 31 by pushing the cover 54 leftwardly in FIG. 13a, whereby the shoulders 56 push the U-shaped member 52 leftwardly to separate the U-shaped contact 32 from the stationary bar conductor 31.

Figure 14:
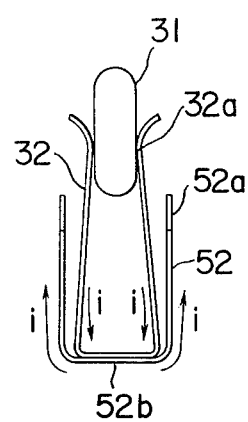
FIG. 14 shows the contact unit shown in FIGS. 12a and 12b for explaining current flow directions.

FIG. 14 shows current flow directions when the U-shaped contact 32 is connected to the bar conductor 31. The separation of the U-shaped contact 32 from the stationary bar conductor 31 due to the electromagnetic repulsive force generated therebetween can be prevented, even if large current flows, for the same reason as described in detail hereinbefore with reference to the separation of the movable bar conductor 5 from the U-shaped contact 11 in conjunction with FIG. 10.

In addition, the connected base portion of the wire 41 is held in the hole formed through the cylindrical member 57 and extends outwardly therefrom, so that the space in the control unit can be effectively used without being obstructed by the wire.

Figure 12B:
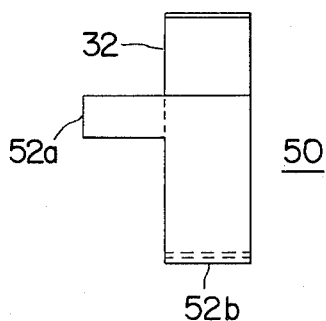
Figure 15A:
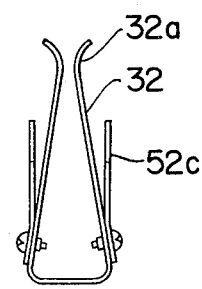
FIGS. 15a and 15b are end and side views showing another example of the contact unit according to this invention.
Figure 15B:
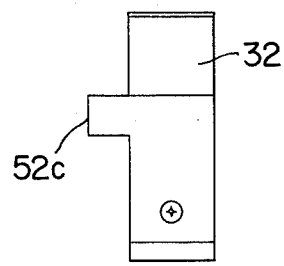

FIGS. 15a and 15b show another example of the contact unit 50 shown in FIG. 12, wherein two L-shaped conductive plates 52c are used instead of the U-shaped conductive member 52 and the lower portions of the L-shaped plates 52c are secured to the both sides of the U-shaped contact 32 by means of welding or bolts. The use of such contact unit enables not only to attain the same advantageous effects as described above with reference to the former example, but also to save the amount of the material utilized to form L-shaped conductive member 52c.

As is apparent from the foregoing descriptions, according to this invention, the separation of a contact unit and a bar conductor after connection thereof can be prevented even in a case where a large current flows in either case when the contact unit of an electrical contact assembly is used on the movable or on the stationary side.

It will be clear that many variations and modifications of the present invention can be made without departing from the scope of this invention.

I claim:

1. In an electrical contact assembly used for a circuit breaker of the type comprising a U-shaped contact, a bar conductor to be connected to said U-shaped contact, and a holder provided with a recess for receiving said U-shaped contact, wherein said U-shaped contact includes end portions near its opening which are narrowed to form contacting portions between which said bar conductor is to be clamped when said U-shaped contact and said bar are engaged, the improvement which comprises conductive members disposed on both sides of said U-shaped contact and electrically connected thereto so that when said U-shaped contact and said bar conductor are engaged, currents passing through said conductive members substantially symmetrically flow in a direction opposite to a flow direction of currents passing through the sides of said U-shaped contact, said conductive members being firmly in contact with the walls of said recess provided in said holder.

2. The electrical contact assembly according to claim 1 wherein said conductive members comprise a U-shaped conductive member provided with a bottom which is electrically connected to the bottom of said U-shaped contact.

3. The electrical contact assembly according to claim 1 wherein said conductive members are L-shaped conductive plates each having one end connected to a corresponding side of said U-shaped contact.

4. The electrical contact assembly according to claim 1 wherein said holder includes a cover provided with an opening through which said contacting portions of said U-shaped contact project and with shoulders against which respective one ends of said conductive members abut when said cover is applied to said holder.

5. The electrical contact assembly according to claim 4 wherein a first semi-cylindrical member provided with a first semi-cylindrical recess is mounted on one surface of said cover, and said holder has a second semi-cylindrical member so as to form a cylindrical member having a through hole formed by said recesses when said cover is applied to said holder to pass a cable through said through hole of said cylindrical member.

* * * * *